United States Patent Office 2,701,799
Patented Feb. 8, 1955

2,701,799

N-HALOALKENYL o-BENZOSULFIMIDES

John J. D'Amico, Charleston, W. Va., assignor to Monsanto Chemical Company, St. Louis, Mo., a corporation of Delaware No Drawing. Application March 19, 1953,
Serial No. 343,509

11 Claims. (Cl. 260—301)

The present invention relates to new compositions of matter and to methods for their preparation. More particularly the present invention relates to N-haloalkenyl o-benzosulfimides. Alkenes containing at least one halogen substituent and an o-benzosulfimide substituent comprise a valuable group of new compounds. Typical examples of o-benzosulfimides, also called 2,3-dihydro-3-oxobenzisosulfonazoles, from which the imido may be derived include 4-chloro-2,3-dihydro-3-oxobenzisosulfonazole, 4-methyl-2,3-dihydro-3-oxobenzisosulfonazole, 6-chloro-2,3-dihydro-3-oxobenzisosulfonazole and 6-methyl-2,3-dihydro-3-oxobenzisosulfonazole. Examples of suitable alkenyl groups include vinyl, allyl, propenyl, isopropenyl, butenyl, pentyl, hexenyl, cinnamyl and decenyl groups substituted by one or more halogen atoms.

Although the methods for preparing the compounds may vary, one convenient method is by condensation of a suitable halogen substituted olefin with an alkali metal salt of the 2,3-dihydro-3-oxobenzisosulfonazole in aqueous medium. 2,3 - dihydro-3-thionobenziosulfonazoles are fully equivalent and compounds having similar properties are produced therefrom. 2,3-dihydro-3-thionobenzisosulfonazoles are readily prepared by heating the 2,3-dihydro-3-oxobenzisosulfonazoles with $P_2S_5$. Suitable substituted olefins comprise cis - 1,2,3 - trichloro - 2 - butene, trans - 1,2,3 - trichloro - 2 - butene, cis-1,2,3-trichloro-1-propene, trans-1,2,3-trichloro-1-propene, 1,3-dichloro-1-propene, 2,3-dichloro-1-propene, 1,3-dichloro-2-butene, 1,3-dichloro-2,4-hexadiene and 2,3,3-trichloro-1-butene. This last compound readily undergoes an allylic rearrangement and is therefore equivalent to 1,2,3-trichloro-2-butene. While the chloro-compounds are preferred for reasons of economy, other halogens such as bromine or fluorine may be used.

The following examples illustrate the preparation of the new compounds but are not to be taken as limitative.

Example 1

A solution of the sodium salt of 2,3-dihydro-3-oxobenzisosulfonazole (saccharin) was prepared by mixing 91.6 grams (0.5 mole) of saccharin and 80 grams (0.5 mole) of 25% aqueous sodium hydroxide and adding thereto 450 ml. of butyl Carbitol and 60 grams (0.36 mole) of potassium iodide. The solution was then stirred while 51 grams (0.41 mole) of 1,3-dichloro-2-butene was added gradually. The reaction mixture was then heated at 100–110° C. for about three hours, cooled to 25° C. and poured into 3000 ml. of ice water. After stirring the ice water mixture for 15 minutes the precipitated solids were removed by filtration, washed with water until the washings were neutral to litmus and dried at 50° C. The product was a tan solid, M. P. 63–65° C. The yield was 74.2% of the theoretical. After recrystallization from ethyl alcohol N-(3-chloro-2-butenyl)-2,3-dihydro-3-oxobenzisosulfonazole melted at 65–66° C. Analysis gave 5.18% nitrogen and 11.69% sulfur as compared to 5.16% nitrogen and 11.80% sulfur calculated for $C_{11}H_{10}ClNO_3S$.

Example 2

To the solution of the sodium salt of saccharin prepared as described in the preceding example, 55.5 grams (0.5 mole) of 2,3-dichloro-1-propene was added slowly. The reaction was completed by heating at 100–110° C. for three hours and the product isolated all as described above. The N-(2-chloroallyl)-2,3-dihydro-3-oxobenzisosulfonazole was a solid, M. P. 122–123° C. without recrystallization. The yield was 69.3% of the theoretical. Analysis gave 5.42% nitrogen, 12.38% sulfur and 13.39% chlorine as compared to 5.44% nitrogen, 12.44% sulfur and 13.76% chlorine calculated for $C_{10}H_8ClNO_3S$.

Example 3

A solution of the sodium salt of saccharin was prepared by mixing 183.18 grams (1 mole) of saccharin and 160 grams (1 mole) of 25% aqueous sodium hydroxide and adding thereto 900 ml. of butyl Carbitol and 120 grams (0.72 mole) of potassium iodide. The solution was then stirred while 111 grams (1 mole) of 1,3-dichloropropene was added gradually. The reaction mixture was then heated at 100–110° C for about three hours and the product isolated as described in Example 1. The yield of N-(3-chloroallyl)-2,3-dihydro-3-oxobenzisosulfonazole, M. P. 71–72° C., was 70.1%. Analysis gave 5.58% nitrogen, 12.60% sulfur and 13.48% chlorine as compared to 5.44% nitrogen, 12.44% sulfur and 13.76% chlorine calculated for $C_{10}H_8ClNO_3S$.

Example 4

A solution containing 0.5 mole of the sodium salt of saccharin was prepared as described in Example 1. To this solution was added 75.52 grams (0.5 mole) of 1,3-dichloro-2,4-hexadiene. The reaction mixture was heated at 100–110° C. for about three hours, cooled to room temperature and poured into 500 grams of crushed ice. The ice mixture was then stirred while 2 liters of cold water were added. The bottom organic layer was then dissolved in 500 ml. of ethyl ether and the ether extract dried over sodium sulfate. The ether was removed by distillation in vacuo. The residue was a dark viscous oil which after standing a few days at 0–5° C. crystallized. The N - (3 - chloro - 2,4 - hexadienyl)-2,3-dihydro-3-oxobenzisosulfonazole was a yellow crystalline solid melting at 55–57° C. It contained 4.18% nitrogen and 10.00% sulfur as compared to 4.70% nitrogen and 10.77% sulfur calculated for $C_{13}H_{12}ClNO_3S$.

The new compounds are intermediates and have other uses. For example, they possess marked herbicidal activity and may be used to destroy undesirable vegetation. As contact herbicides they exhibit marked selectivity to grasses. The application to grown foliage of a spray containing 1% by weight of N-(3-chloroallyl)-2,3-dihydro-3-oxobenzisosulfonazole caused very severe injury whereas similar application to broad leaved plants had no noticeable effect. On the other hand pre-emergence application at the rate of 50 pounds per acre severely injured both types of test plants which included sunflower, cotton, sugar beets, red clover, mustard and domestic rye grass.

It is intended to cover all changes and modifications of the examples of the invention herein chosen for purposes of disclosure which do not constitute departures from the spirit and scope of the invention.

What is claimed is:

1. A substituted alkene containing less than 11 carbon atoms in the chain and less than 3 double bonds, at least one halogen substituent and one substituent derived by removal of the hydrogen on the nitrogen atom from a compound selected from the group consisting of 2,3-dihydro - 3 - oxobenzisosulfonazole, 2,3 - dihydro-3-thionobenzisosulfonazole and chloro and methyl substituted derivatives thereof.

2. A substituted alkene containing less than 11 carbon atoms in the chain and less than 3 double bonds, one chloro substituent attached to a double bonded carbon atom and one substituent linked to a methylene group derived by removal of the hydrogen on the nitrogen atom of 2,3-dihydro-3-oxobenzisosulfonazole.

3. A composition comprising the structure

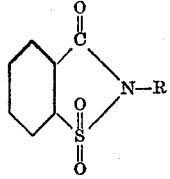

where R represents a chloro substituted unsaturated hydrocarbon chain radical containing less than 11 carbon atoms and at least one but not more than two chloro substituents attached to unsaturated carbon atoms.

4. A composition comprising the structure

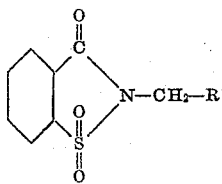

where R represents a chloro substituted 1-alkenyl group containing less than 11 carbon atoms and at least one but not more than two chloro substituents attached to unsaturated carbon atoms.

5. N - (3-chloro-2-butenyl) - 2,3 - dihydro-3-oxobenzisosulfonazole.

6. N - (2 - chloroallyl) - 2,3 - dihydro - 3 - oxobenzisosulfonazole.

7. N - (3 - chloroallyl) - 2,3 - dihydro - 3 - oxobenzisosulfonazole.

8. N-(3 - chloro-2,4-hexadienyl) - 2,3 - dihydro-3-oxobenzisosulfonazole.

9. The method of preparing a halogen substituted alkenyl alkali metal salt of saccharin which comprises condensing an o-benzosulfimide with a poly halo olefin of the structure Hlg—CH₂—R where Hlg represents a halogen atom and R represents a halogen substituted alkenyl group containing less than 10 carbon atoms, and removing only part of the halogen.

10. The method of making a halogen substituted alkenyl o-benzosulfimide which comprises condensing an alkali metal salt of saccharin with a poly halo olefin of the structure Cl—CH₂—R where R represents a halogen substituted 1-alkenyl group containing less than 10 carbon atoms and removing only one halogen atom.

11. The method of making a halogen substituted alkenyl o-benzosulfimide which comprises condensing the sodium salt of saccharin with a polychloroolefin of the structure Cl—CH₂—R where R represents a chlorosubstituted 1-alkenyl group containing less than 10 carbon atoms and having the chloro substituents linked to unsaturated carbon atoms.

References Cited in the file of this patent

Eckenroth et al.: Beilstein (Handbuch, 4th ed.), vol. 27, p. 172 (1937).